Figure 1:
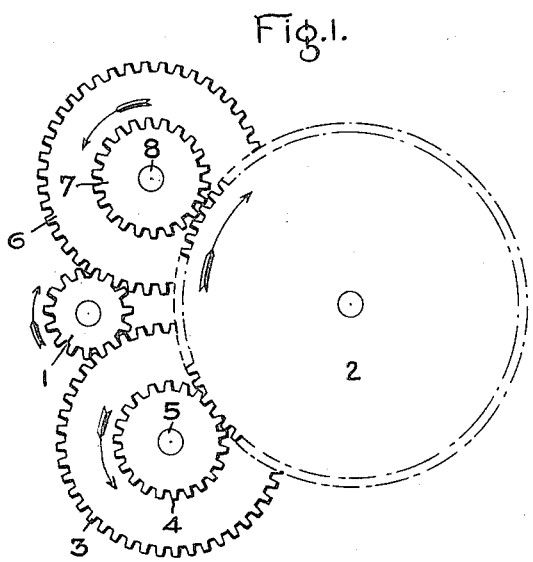

K. ALQUIST.
GEARING.
APPLICATION FILED JAN. 17, 1914.

1,165,827.

Patented Dec. 28, 1915.

WITNESSES:

INVENTOR:
KARL ALQUIST,
BY
HIS ATTORNEY.

UNITED STATES PATENT OFFICE.

KARL ALQUIST, OF SCHENECTADY, NEW YORK.

GEARING.

1,165,827.

Specification of Letters Patent. Patented Dec. 28, 1915.

Application filed January 17, 1914. Serial No. 812,812.

*To all whom it may concern:*

Be it known that I, KARL ALQUIST, a subject of the King of Sweden, residing at Schenectady, county of Schenectady, State of New York, have invented certain new and useful Improvements in Gearing, of which the following is a specification.

My invention relates to gearing such as is used for the transmission of power and for speed reduction or magnification for an almost unlimited variety of purposes, including the driving of dynamo electric machines and of marine propellers by steam turbines, etc.

The invention is concerned both with individual gears of very general utility and with trains of gearing whose functional advantages are increased and enhanced when they include individual gears such as my invention contemplates.

Among the advantages obtainable through my invention are equality of loading and wear among gears arranged in parallel; minimization of the ill effects arising from inaccurate location of bearings and other similar errors; uniformity of loading and wear among the teeth of individual gears; smooth, even, noiseless running; and others that will hereinafter become apparent.

In the case of two or more gears arranged in parallel so as to be driven by or to drive a common gear, it is impossible to secure substantially and uniformly equal division of load among the gears and so avoid danger of overstraining their teeth, etc., unless the teeth of both the parallel gears are in contact with those of such common driving or driven gear with substantially the same average tooth pressure; and for the best results it is necessary that the tooth pressures should be actually equal at all points as well as of the same average value. In ordinary gearing, equality of the average tooth pressure among parallel gears depends on the accuracy with which their bearings are located and maintained in proper positions, while actual and uniform equality of the tooth pressures depends, in addition, on uniformity and exact similarity of their teeth as regards both form and spacing.

In accordance with my invention, I provide for relative adjustment of parallel gears to secure equality of average tooth pressure even when their bearings are inaccurately located, or when the substantially fixed angular relation of two gears having a common axis differs from that of two similar gears in parallel with them, for example. Also, to secure substantial equality of actual tooth pressures, I include among the gears one or more specially constructed ones whose teeth or toothed portions, at least, are capable of yielding with reference to their shafts, these gears serving to minimize or nullify the ill effect of any errors or imperfections in the toothing of any of the gears and affording various other advantages. In such special gears, I may make at least the toothed portions in laminæ or disks arranged side by side in mesh with a common driving or driven gear or the like, mounting or securing the toothed portions or members in such wise that although, generally speaking, they turn with their hub or shaft in a substantially fixed angular relation so as to transmit power to or from it effectually, yet they may upon occasion yield more or less independently of one another by way of rotary adjustment, so as to prevent excessive loading of a tooth or teeth of any of them. It is of advantage that the toothed members should be caused to turn with their hub or shaft by resilient connecting means, since such means will upon occasion be capable of advancing a member about the hub or shaft and so directly prevent relative overloading thereof.

With spiral or helical gears, which are preferable for high speeds, it is of advantage to provide for additional circumferential yielding of the teeth by lateral flexibility of the toothed portion of the gear member, and in this case the best results can be secured by specially proportioning the axial width of the teeth as hereinafter set forth. The utility of this last feature, however, is not confined to gears whose toothed portions are yieldingly secured to turn with their hub or shaft, any more than that of such gears is confined to special trains of gearing such as my present invention embraces.

Figure 4:
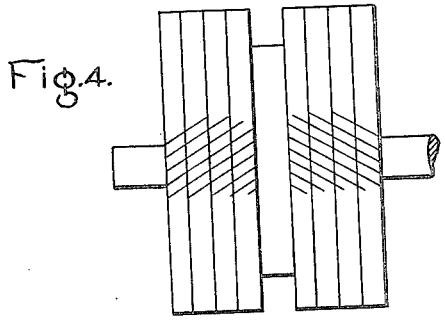
Figure 5:
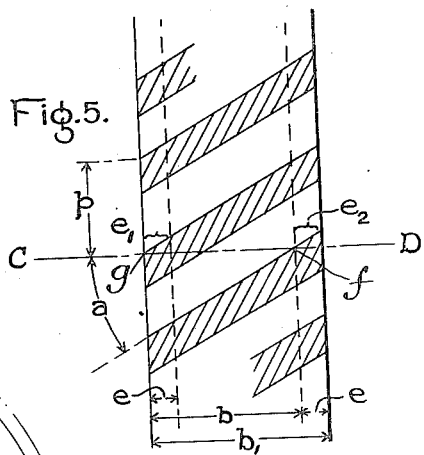
Figure 3:
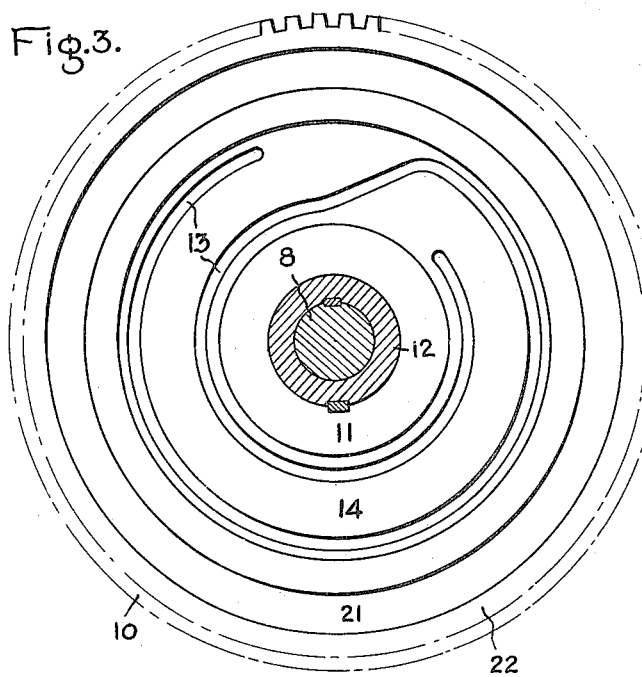
Figure 2:
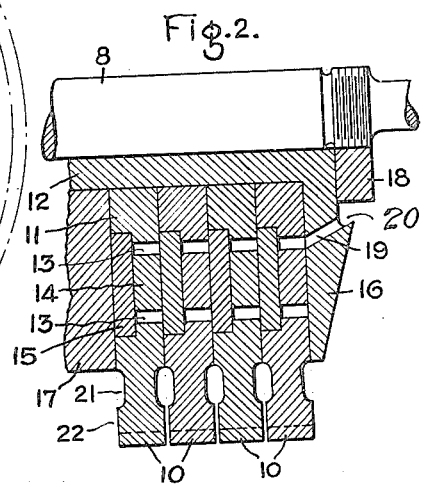

In the accompanying drawing, Figure 1 shows a multiple reduction train of gearing constructed in accordance with my invention. Fig. 2 is a fragmentary axial section on a greatly enlarged scale illustrating the construction of a special gear such as may be used in the train shown in Fig. 1. Fig. 3 is a view of one of the gear members shown in section in Fig. 2. Fig. 4 is a general view of a gear more or less like that shown in Figs. 2 and 3. Fig. 5 is a fragmentary detail view of the periphery of a gear member, on a further enlarged scale, the teeth being in section at the pitch line.

The train of gearing shown in Fig. 1 comprises a small driving gear 1, a large gear 2 to be driven at a reduced speed, and driving connections between them consisting of a pair of coaxially arranged gears 3, 4 secured on their shaft 5 in substantially fixed angular relation to one another and a pair of identically similar gears 6, 7 similarly mounted on their shaft 8. The gears 3 and 6 are about five times as large as the gear 1 and the gear 2 is about three times as large as the gears 4 and 7, so that the speed reduction between the gears 1 and 2 is about 15 to 1. As shown, the teeth of the gears 1 and 3 and 4 and 2 have the proper bearing for the directions of rotation indicated; but although the teeth of the gears 1 and 6 bear properly for driving by the former, those of the gears 7 and 2, which are shown out of mesh for the sake of clearness, are not in such relative positions as to bear properly for driving of the latter by the former when brought into mesh position by shifting of the shaft 8 toward the gear 2. If the angular distances between the teeth of the gears 6 and 7 that are nearest to angular coincidence were everywhere the same, this condition and the consequent failure of the gears 6 and 7 to carry their part of the load could be remedied only by shifting of bearings or readjustment of the angular relation of the gears 6 and 7 or 3 and 4 on their respective shafts. As shown, however, the angular distances of the teeth of the gears 6 and 7 (and also of the gears 3 and 4) that are nearest to angular coincidence is different in different parts of their peripheries, so that by taking the shaft 8 from its bearing, turning it a little, and replacing it,—repeating this operation as often as necessary,—substantially proper bearing between the teeth of the gears 7 and 2 can be secured without impairment of that between the teeth of the gears 1 and 6 or disturbance of the gears 1, 3, 4 and 2. The greatest degree of refinement in this adjustment can be secured by making the number of teeth in the gear 3 just one more or one less than an exact multiple of the number in the gear 4, as shown (or conversely), and by making the tooth pitch as small as other considerations render expedient. If the adjustment fails to produce an exact equality of loading between the parallel driving connections, it will at least minimize the inequality,—being making it possible to have all the sides making it possible to have all the various gears intermesh simultaneously, even in extreme cases.

Nothing has so far been said about the character or the construction of the various gears shown in Fig. 1, since the advantages above set forth can be realized with any accurately cut gears. For reasons already more or less fully indicated, however, I prefer that at least one of the gears 3 and 6 should be of a special construction such as is illustrated in Figs. 2 and 3. In the particular construction shown, such special gear comprises a number of sections arranged side by side in mesh with the gear 1 and themselves comprising separate ring members 10 secured to turn with the shaft 8 through resiliently yielding metallic connections to ring-like hubs 11 keyed on a sleeve 12 that is itself keyed fast on the shaft 8. While various modes of construction and various forms of spring connection can be used, I prefer forming the parts 10 and 11 of each gear section from a common disk of metal and using part of this disk itself to form the spring. This may be done by milling out slots 13 between the inner and outer portions of the disk in such a way that these parts are finally connected only by an intermediate spring ring 14 of nearly a complete turn, at the one end united with the gear ring 10 and at the other end united with the inner part or ring 11 (Fig. 3), which is, in turn, fixed to the shaft 8 as already described.

The gear ring or member must in any case be centered or supported about the shaft 8, which can be done by another ring 15 fitted between it and the hub 11. As shown, the spring portion 14 is turned down to about one-half of the thickness of the outer and inner rings 10 and 11 and the centering ring 15 is fitted in the recess or space thus formed, so as to be held from the central part 11 and serve as a bearing for the gear ring 10. The gear sections (the hubs 11 being free to move lengthwise on the sleeve 12, although constrained to turn with it) are held between stiff end supports 16 and 17 (Fig. 3), which with the sleeve 12 are held in place by nuts 18 (only one being shown) threaded on the shaft 8. The sleeve 12 may be made of such length that some slight play will be afforded the gear sections; or the whole system may be compressed axially to some extent so as to damp oscillations. To prevent wear, the gear wheel may be flooded with oil from the center when running. As shown, there are a number of diagonal passages 19 running from an annular trough or oil catcher 20 on the end support 16 into the inner portions of the slot 13, so that the oil will be fed in by centrifugal force and circulate out between the parts to the periphery of the gear.

While a gear constructed as above set forth may be of either straight or helical toothed type, special advantages can be obtained by embodying in it the principles of the type of axially flexible helical gearing described in British Patents 28,804 of 1910 and 17,244 of 1911. With a gear thus constructed, the axial deflection of the teeth or the toothed portions of the gear laminæ or disks and the resultant slight circumferential deflection serve principally to give a smooth running and the larger directly rotative or tangential deflection or adjustment obtained by the individual resilient or other yielding of the gear laminæ or disks serves principally to take care of sudden load changes, poor shaft alinement, and other errors due to faulty workmanship, etc.,—although neither the axial flexibility nor the direct rotary adjustment of the gear disks performs exclusively the functions mentioned. As shown, axial or lateral flexibility is obtained by reducing the thickness of the ring members 10 on either side, so that local bending may take place at the thin part 21. While the inner portions of the rings 10 are firmly guided, individual freedom of axial deflection is given the toothed peripheral or rim portions 22 by making them of less thickness than the inner portions, so that there will be a space between them. The stiff end supports 16 and 17, it will be seen, are of smaller diameter than the gear rings 10, so as to leave the toothed portions free to yield.

It is usually preferable that helical gears should be of the double or divided herringbone type, in order that they may be balanced as regards axial thrust, and the gears 4 and 6 are supposed to be gears of this sort. Such a divided gear is somewhat diagrammatically shown in Fig. 4, each half being intended to embody the construction shown in Figs. 2 and 3. Coming, now, to the matter of the axial width of the teeth of this or any other form of laminated laterally flexible helical gear, I have found that when a gear is built up from a group or pack of comparatively thin laminations or disks the individual teeth in a given lamination run in certain respects under conditions approximating those of ordinary straight teeth and under similar disadvantages, although the teeth are cut helically across the pack of laminations. In particular, the essential characteristic of the helical type as usually constructed, is practically missing, and the work is distributed over the whole tooth surface in much the same way as in the case of straight spur gearing. That is to say, the load is not transmitted on the pitch line (where there is no sliding action) except at very short intervals when the toothed surface passes through a plane passing through the centers of the two gears. At all other times the pressure is transmitted above or below the pitch line where there is a sliding action between the two teeth. In order to obtain the special advantages of the helical type of gearing with the laminated or disk construction while retaining the advantage of flexibility and avoiding certain difficulties present in connection with the running of such gearing, it is important, I have found, that the teeth of each disk should have a certain axial width—depending upon the tooth pitch and the angle of the teeth with the axis—such as to give continuously a pitch-line contact, and preferably but a single continuous pitch-line contact. This width is determined by what may be called the principle of continuous pitch line: i. e., each disk should have such a width that the projection on a plane at right angles to the axis of the gear of all the pitch lines of the teeth of the disk will form a complete circle. The pitch lines may be considered as imaginary lines formed by the intersection of the surfaces of the contact sides of the teeth and the surfaces of imaginary cylinders concentric with the gear axes and having diameters equal to the pitch diameters of the gear wheels and thus being in rolling contact along a line parallel with the axis, the drive line, as the gears revolve. This principle may also be stated in another form by saying that each individual disk should carry the load at any time only on one single (theoretical) pressure point, being a point common to the driving line and the pitch line,—or that, in other words, the number of pitch line pressure points in the whole gear should be equal to the number of disks. The required axial width will be given by the equation:

$$b = p/\tan a$$

where $b$=axial tooth width for a section, $p$=circumferential tooth pitch and—$a$= angle of teeth with axis.

In practice it is advisable to add about 10% to the theoretical width given for reasons of strength of the teeth against excessive bending, so that the full load may never be carried just at the end of a tooth where it is weakest. This will, of course, add to the length of the gear, but on account of the relative increase in strength of the teeth thus obtained a smaller pitch may be used, which more than makes up for the additional length by increasing the wearing surface, as now there will be more teeth crossing the driving line per unit length. The combination described gives about the maximum power transmission obtainable for a certain size of gear.

The foregoing equation and remarks are illustrated by Fig. 5, which gives a somewhat diagrammatic view of a portion of the rim of a gear section, the teeth being shown in section at the pitch line. Here the line C—D represents the driving line, and $p$ and $a$ are respectively the circumferential tooth pitch and the helical angle of the teeth. The theoretical width is $b$, the width added for practical reasons as above set forth is $e$, and the total actual, practical width is thus $b$ plus $e=b_1$. The load is simultaneously carried at $e_1$ and $e_2$.

A pressure point, as previously described, is the intersection between the line C—D and a pitch line, and it will be understood from the figures that when the disks revolve (the driving line being stationary) such a pressure point will move along a pitch line as this line crosses the line C—D. Each disk will, therefore, have only one pressure point on the main or middle portion of its face or width for transmitting the load at any time, but will have two pressure points on parts $e_1$ and $e_2$, while the load is shifted from one tooth to the next. Fig. 2 shows the teeth in such position with reference to the driving line C—D that the two pressure point period is just commencing, one pressure point being at $f$ and the other about to start at $g$.

It will be understood that if the width of the sections is increased substantially beyond the dimensions given, the load for a given gear disk will be carried the one moment on two points and the next moment on one point, thus giving unequal surface load. If the width were increased so that two points were theoretically always carrying the load; i. e., if the width were doubled, this would at first sight seem to be an acceptable condition, but, apart from other disadvantages, it will be found that as a rule only one point carries the load of the section, owing to the deflection, and a larger pitch would have to be chosen for reasons of strength, involving loss in wearing surface, and in general practice such a gear will be considerably inferior to the one pressure point type described. I do not claim herein the invention as related to the width of disks as just described since this forms the subject matter of my divisional application Serial No. 25,513, filed May 3, 1915. Neither do I claim herein the invention as related to the train of gearing as this is embodied in my continuing application Serial No. 36,961, filed June 29, 1915.

Referring once more to the train of gears shown in Fig. 1, it is preferable that when a yielding gear is used it should be one of the parallel gears rather than either of the gears 1 and 2, since in the former case only tooth flexibility would help in the equalization of the load. Of the gears 3, 6 and 4, 7, it is preferable that one of the former be yielding.

In accordance with the provisions of the patent statutes, I have herein set forth the principles of my invention and described the best embodiment thereof at present known to me. While, however, the invention extends to the particular apparatus described and its various specific features and details and novel combinations and arrangements of parts, it is not confined thereto, but can be otherwise carried out and embodied.

What I claim as new and desire to secure by Letters Patent of the United States, is—

1. A gear comprising a plurality of laterally flexible helical toothed members arranged side by side with the toothed portions of the teeth of each member being free to yield, the teeth of each member being substantially of such a width as to give continuous pitch line contact and said members being secured to turn with their shaft so as to be capable of yielding independently of one another by way of rotary adjustment relative to said shaft.

2. A gear comprising a helical toothed member whose toothed portion is laterally flexible and free to yield and a metallic spring connection between said member and the gear shaft whereby the former is caused to turn with the latter.

3. A gear comprising a plurality of helical flexible toothed members arranged side by side and secured to turn with their shaft so as to be capable of yielding by way of rotary adjustment with reference thereto independently of one another.

4. A gear comprising a plurality of toothed members arranged side by side and secured to turn with their shaft through resiliently yielding metallic connections, so that they shall be capable of independent rotary adjustment relative to said shaft when the tooth pressure varies.

5. A gear comprising a plurality of toothed members arranged side by side and each secured to turn with their shaft by means of a spring extending from a connection with the shaft to a connection with the same, said members being centered on the shaft independently of their connecting springs.

6. A gear comprising a plurality of gear sections arranged side by side and each comprising a hub secured to the shaft, a toothed ring, and a spring ring connecting them, said parts being in one piece and the spring being formed by the cutting of slots therein.

7. A gear comprising a plurality of gear disks arranged side by side and each comprising a toothed ring portion, a hub portion, and an intermediate spring ring portion of less thickness than said ring and said hub connecting them so that they shall turn together, and centering rings arranged between the hubs and the rings and affording bearing for the former.

8. A gear comprising a plurality of helical toothed gear sections arranged side by side and secured to turn with their shaft through separate resiliently yielding metallic connections, the toothed portions of said sections being laterally flexible and free to yield.

In witness whereof, I have hereunto set my hand this 16th day of January, 1914.

KARL ALQUIST.

Witnesses:
  HELEN ORFORD,
  MARGARET E. WOOLLEY.